United States Patent
Memmen et al.

(10) Patent No.: US 10,024,170 B1
(45) Date of Patent: Jul. 17, 2018

(54) INTEGRALLY BLADED ROTOR WITH BORE ENTRY COOLING HOLES

(71) Applicants: Robert L Memmen, Stuart, FL (US); Wesley D Brown, Jupiter, FL (US)

(72) Inventors: Robert L Memmen, Stuart, FL (US); Wesley D Brown, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/203,905

(22) Filed: Jul. 7, 2016

Related U.S. Application Data

(63) Continuation-in-part of application No. 15/190,703, filed on Jun. 23, 2016, now abandoned.

(51) Int. Cl.
 *F01D 5/18* (2006.01)
 *F01D 5/08* (2006.01)

(52) U.S. Cl.
 CPC .......... *F01D 5/186* (2013.01); *F05D 2220/32* (2013.01); *F05D 2260/202* (2013.01)

(58) Field of Classification Search
 CPC ..... F01D 5/34; F01D 5/02; F01D 5/10; F01D 5/187; F01D 5/186; F01D 5/085; F01D 5/088; F01D 5/087; F05D 2260/20; F05D 2260/202; F05D 2220/32; Y02T 50/676
 See application file for complete search history.

(56) References Cited

U.S. PATENT DOCUMENTS

| | | | | |
|---|---|---|---|---|
| 4,312,625 A | * | 1/1982 | Pinaire | F01D 5/187 415/178 |
| 4,447,188 A | * | 5/1984 | Davis | F01D 5/028 415/115 |
| 4,522,562 A | * | 6/1985 | Glowacki | B23H 9/10 415/116 |
| 5,244,345 A | * | 9/1993 | Curtis | F01D 5/22 416/193 A |
| 5,317,877 A | * | 6/1994 | Stuart | F02C 7/185 60/736 |
| 5,465,780 A | * | 11/1995 | Muntner | B22C 9/04 164/369 |
| 5,860,789 A | * | 1/1999 | Sekihara | F01D 5/066 416/201 R |
| 5,961,287 A | * | 10/1999 | Cairo | F01D 5/02 416/208 |
| 6,514,038 B2 | * | 2/2003 | Akiyama | F01D 5/084 415/114 |
| 7,241,111 B2 | * | 7/2007 | Harding | F01D 5/02 415/218.1 |
| 7,559,745 B2 | * | 7/2009 | Falk | F04D 29/284 416/188 |

(Continued)

*Primary Examiner* — Logan Kraft
*Assistant Examiner* — Joshua R Beebe
(74) *Attorney, Agent, or Firm* — John Ryznic

(57) ABSTRACT

An integrally bladed rotor with an axial bore having either an inward dishing shape or an axial straight shape with an annular inward projection in which radial cooling holes having an elliptical cross sectional shape are formed, where the radial cooling holes have an elliptical cross sectional shape with a major axis perpendicular to the axial bore in order to reduce stress near an inlet opening of the radial holes in order to increase the LCF life of the IBR. The radial cooling holes discharge into a circumferential channel that is connected to cooling holes extending in the rotor blades.

13 Claims, 8 Drawing Sheets

(56) References Cited

U.S. PATENT DOCUMENTS

| | | | | |
|---|---|---|---|---|
| 7,578,656 | B2* | 8/2009 | Higgins | F01D 5/02 |
| | | | | 416/244 A |
| 7,585,148 | B2* | 9/2009 | Hoell | F01D 5/026 |
| | | | | 415/115 |
| 2005/0232780 | A1* | 10/2005 | Newman | F01D 5/081 |
| | | | | 416/234 |
| 2008/0025843 | A1* | 1/2008 | Scope | F01D 5/02 |
| | | | | 416/204 A |
| 2008/0295988 | A1* | 12/2008 | Bancheri | B22D 29/002 |
| | | | | 164/47 |
| 2010/0326039 | A1* | 12/2010 | Arase | F01D 5/081 |
| | | | | 60/39.01 |
| 2013/0259685 | A1* | 10/2013 | Are | F01D 5/087 |
| | | | | 416/1 |
| 2014/0348664 | A1* | 11/2014 | Jan | F01D 5/081 |
| | | | | 416/96 R |

* cited by examiner

INTEGRALLY BLADED ROTOR WITH BORE ENTRY COOLING HOLES

CROSS-REFERENCE TO RELATED APPLICATIONS

This application is a CONTINUATION-IN-PART of U.S. patent application Ser. No. 15/190,703 filed on Jun. 23, 2016 and entitled INTEGRALLY BLADED ROTOR WITH BORE ENTRY COOLING HOLES.

GOVERNMENT LICENSE RIGHTS

None.

BACKGROUND OF THE INVENTION

Field of the Invention

The present invention relates generally to a gas turbine engine, and more specifically to an integrally bladed rotor for a small gas turbine engine with blade cooling.

Description of the Related Art Including Information Disclosed Under 37 CFR 1.97 and 1.98

In a gas turbine engine, compressed air from a compressor is supplied to a combustor and burned with a fuel to produce a hot gas stream that is then passed through a turbine to produce mechanical energy. In an aero engine, the turbine drives both the compressor and a fan that produces the propulsion to power an aircraft.

The efficiency of the engine can be increased by passing a higher temperature gas stream through the turbine. However, the turbine inlet temperature is limited to the material properties of the turbine as well as the effectiveness of the turbine cooling. Compressed air is bled off from the compressor and passed through cooling circuits formed within stator vanes and rotor blades of the turbine to allow for higher turbine gas stream temperatures.

Turbine rotor blades are typically formed as a single piece with an airfoil extending from a root and platform to form the single piece rotor blade. The root typically has a dovetail or fir tree shape that is inserted into a slot form on an outside surface of a rotor. A small gas is thus formed between the blade root attachment and the rotor disk slot. In a large engine such as the type that powers a large aircraft, this gap is small compared to the size of the rotor. Thus, any leakage across the gap will be small compared to the flow passing through the rotor. However, for a small gas turbine engine such as those used to power a Unmanned Aero Vehicle (UAV), the gap is large when compared to the flow through the smaller rotor. For a gas turbine engine with a rotor with a diameter of less than four inches, any gap formed between the blade attachment and the rotor disk slot will be large and therefore the leakage flow across the rotor will be significant. For this reason, small gas turbine engines typically use an integrally bladed rotor (IBR) in which the rotor and the blades are all formed as a single piece to eliminate the gaps.

When cooling of airfoils is incorporated in a turbine engine, the non-cooling usage of the cooling air (leakage) is minimized as this represents a penalty to the engine cycle and reduces engine efficiency. Rather than routing cooling air to the blades past the rim of the disk (high leakage) it is desired to rout the cooling air from the bore of the disk, through the center of the disk, and to the blades. In the prior art, this approach has been avoided due to the reduction of the disk LCF (Low Cycle Fatigue) life caused by the hole entrance at the bore.

BRIEF SUMMARY OF THE INVENTION

An Integrally Bladed Rotor (IBR) for a small gas turbine engine in which the rotor includes radial extending cooling supply holes that open within an axial bore of the disk and discharge into a circumferential extending cooling channel formed just below platforms of the blades. The radial cooling air supply holes have an elliptical cross sectional shape with a major axis aligned perpendicular to an axis of the axial bore and a minor axis aligned parallel to the axis of the axial bore so that stress levels within the disk are reduced to acceptable Low Cycle Fatigue (LCF) levels.

The radial cooling supply holes open into an axial bore having a curvature or dishing inward shape in order to locate the hole openings away from high stress areas. In another embodiment, the axial bore is formed straight but with projections in which the radial cooling holes open.

The IBR is formed with the radial cooling supply holes and the circumferential channel cast together, and then blade cooling holes are drilled using an EDM method because of the small size of the blades.

Compressed air for cooling of the first stage rotor blades is discharged from the compressor and flows around the combustor liner where some of the compressed air is bled off and passed through angled holes in a static part of the combustor case to provide the compressed air with a tangential flow component or swirling motion. The swirling compressed air is then passed into a rotating part of the rotor such that parasitic windage lose is minimized. The compressed air is then delivered to the inner bore of the rotor where the cooling air is further compressed due to rotation of the rotor before passing into the cooling channels of the blades.

DETAILED DESCRIPTION OF THE INVENTION

The present invention is an IBR with cooling air supply holes passing through the disk or axial bore and opening into the bore where the bore cooling air supply holes have an elliptical cross sectional shape with a major axis perpendicular to the IBR bore axis and the minor axis parallel to the bore axis. This structure solves the hoop stress related LCF issue but introduces a very high axial compressive stress due to the stress concentration at the acute corner of the elliptical hole entrance. The axial compressive stress at the bore is caused by the blade and rim of the disk pulling outward and the disk bore restraining this pull. The center of the bore wants to move outward but is restrained causing the axial compressive stress. By dishing the bore inward, the axial compressive component of the stress is reduced and the hole entrance stress concentration yields a greater LCF life.

Turbine rotor disks are designed to transmit torque from the rotor blades to the rotor shaft and to retain the blades in a stable condition. High rotational loads result in very high tensile bore stress in the tangential direction called hoop stress. At the same time, there is an axial compressive stress in the bore of the disk. The hoop stress and the axial stress are both indicated in FIG. 3 which occur near to where the radial cooling holes open into the axial bore of the IBR 10. When passages are formed in the center of the disk passing from the bore to the rim for the purpose of supplying cooling air to the blades, a decreased LCF lives are calculated at the location of the hole entrance. The LCF life can be increased at this location by forming the passages in an ellipse such that the less acute curve abuts the hoop direction and the more acute curve abuts the axial compressive load direction.

Secondary cooling air leakage becomes more problematic as engine size is reduced. To mitigate this cooling air leakage, the present invention introduces the cooling air to feed the blade cooling passages at the bore of the disk. This design precludes flooding the rim cavity with cooling air and essentially eliminates the leakage.

Figure 1:
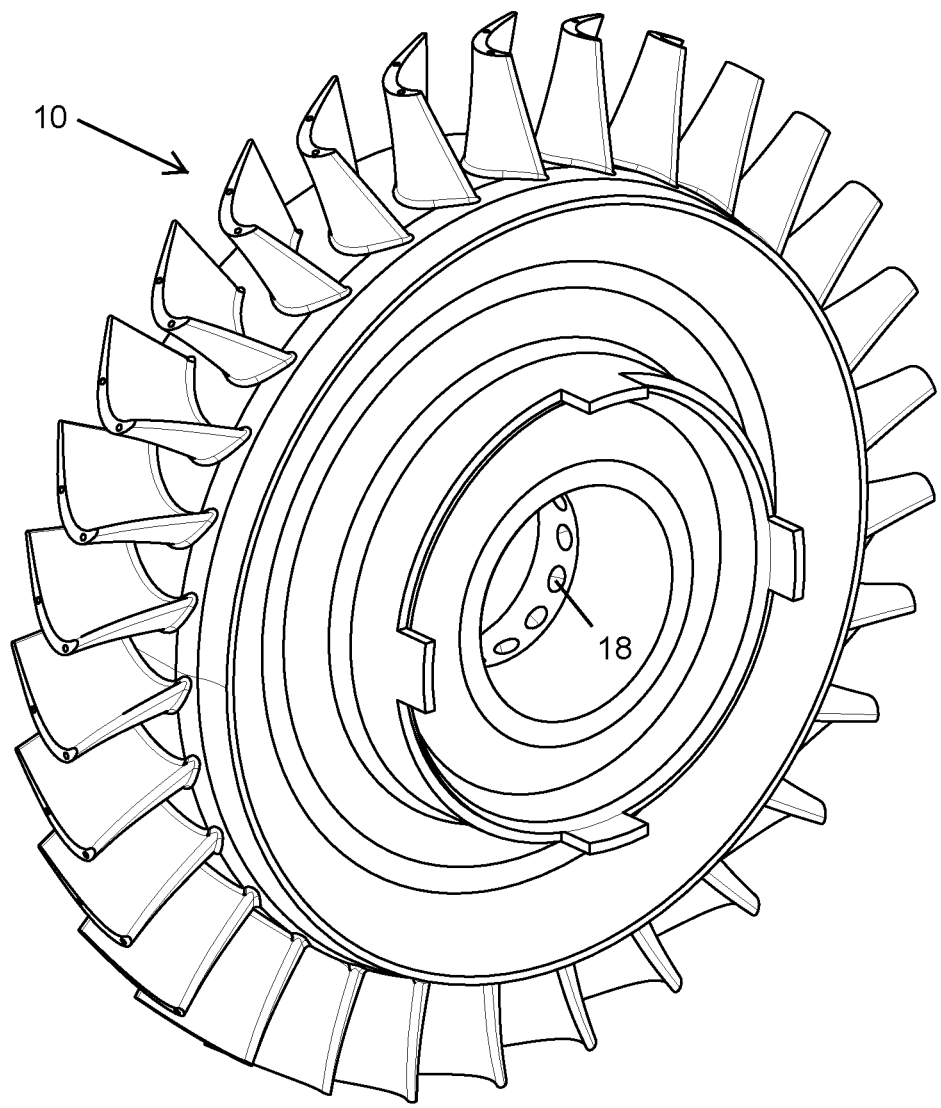
FIG. 1 shows a schematic view of an integrally bladed rotor with disk bore cooling holes of the present invention.
Figure 2:
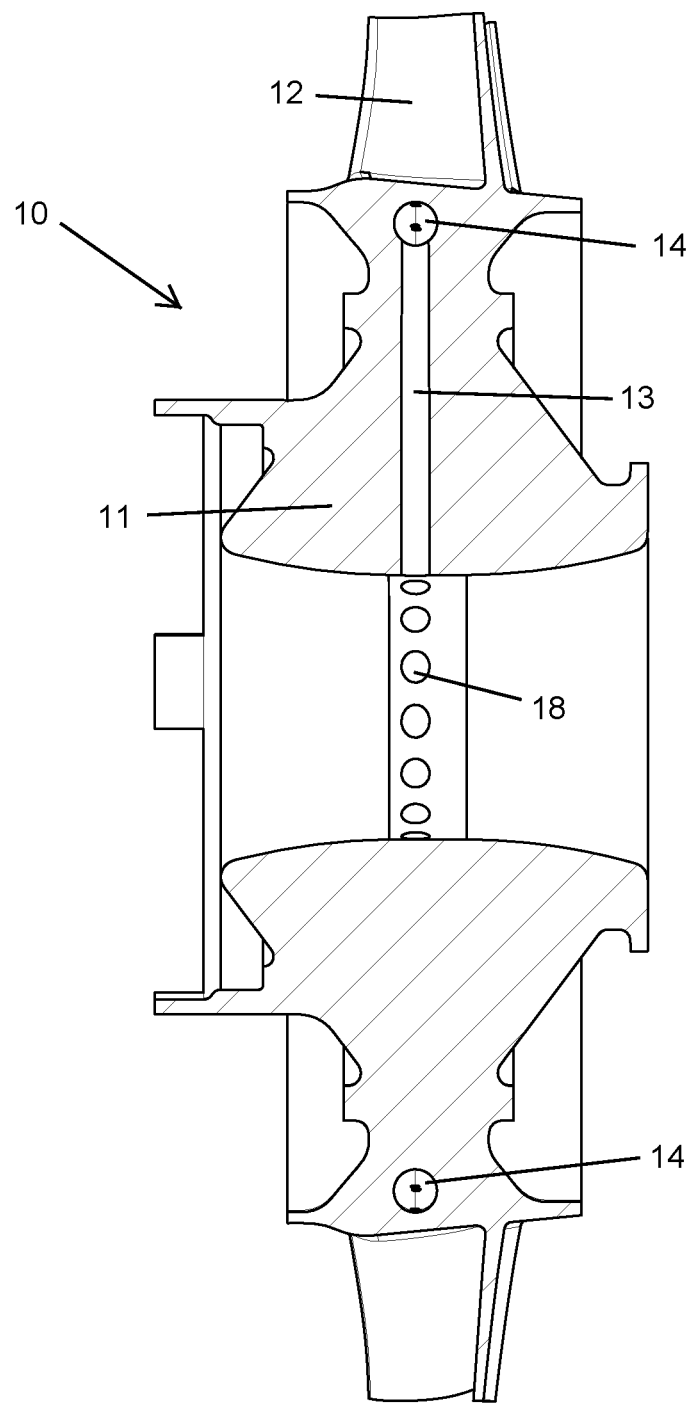
FIG. 2 shows a cross section view of the IBR of FIG. 1 with the disk bore entrance holes and radial holes and a circumferential channel in the IBR of the present invention.

FIG. 1 shows the IBR 10 of the present invention with a bore having an annular arrangement of cooling air entrance holes 18. FIG. 2 shows a cross section cutaway view of the IBR of FIG. 1 with the radial cooling holes 13 and the circumferential channel 14. The entrance holes 18 for the radial cooling holes 13 open into the axial disk bore of the IBR 10.

Figure 3:
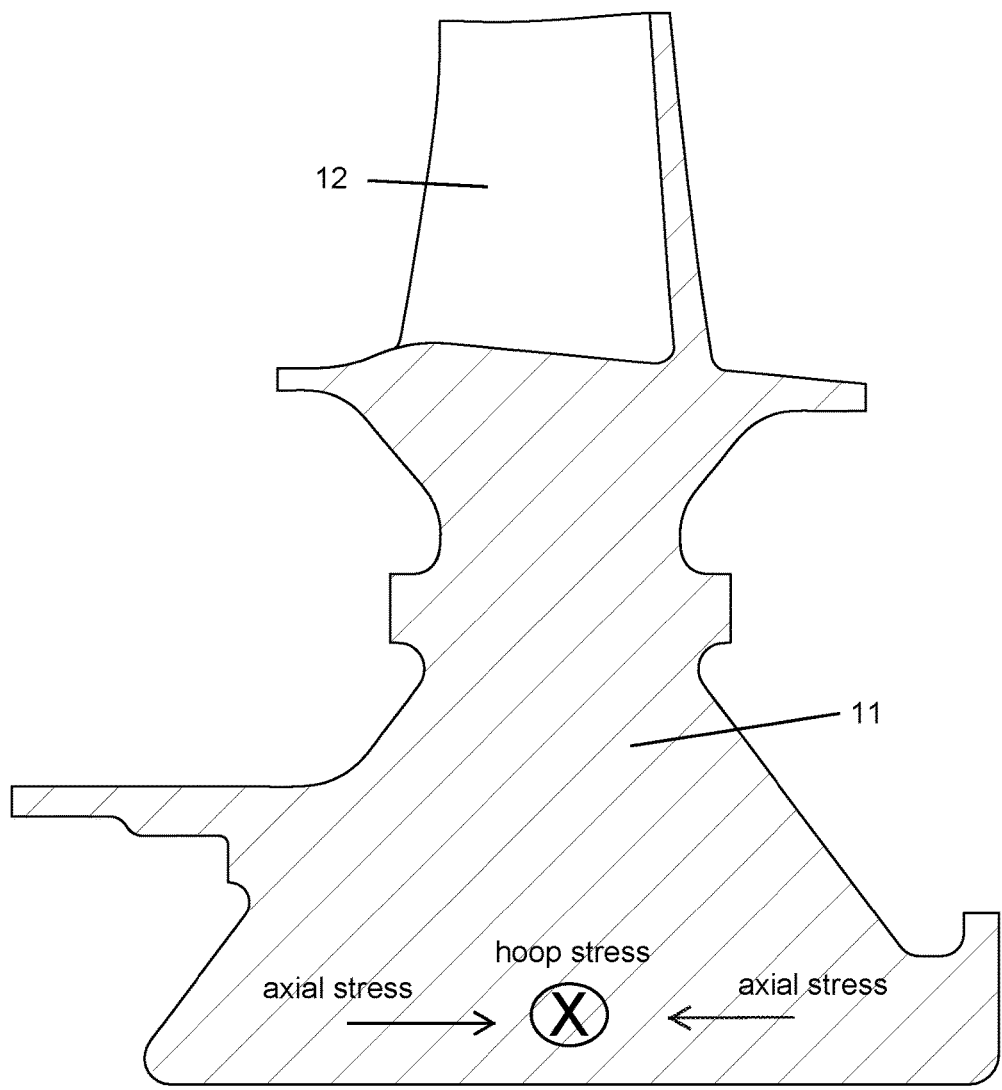
FIG. 3 shows a cross section side view of an IBR with axial and hoop stress directions of the present invention.

FIG. 3 shows a cross section view of the IBR with the hoop stress and the axial stress acting on the disk near an inner diameter of the axial bore of the IBR 10 due to rotation. The rotor blades 12 extend out from the disk 11.

Figure 4:
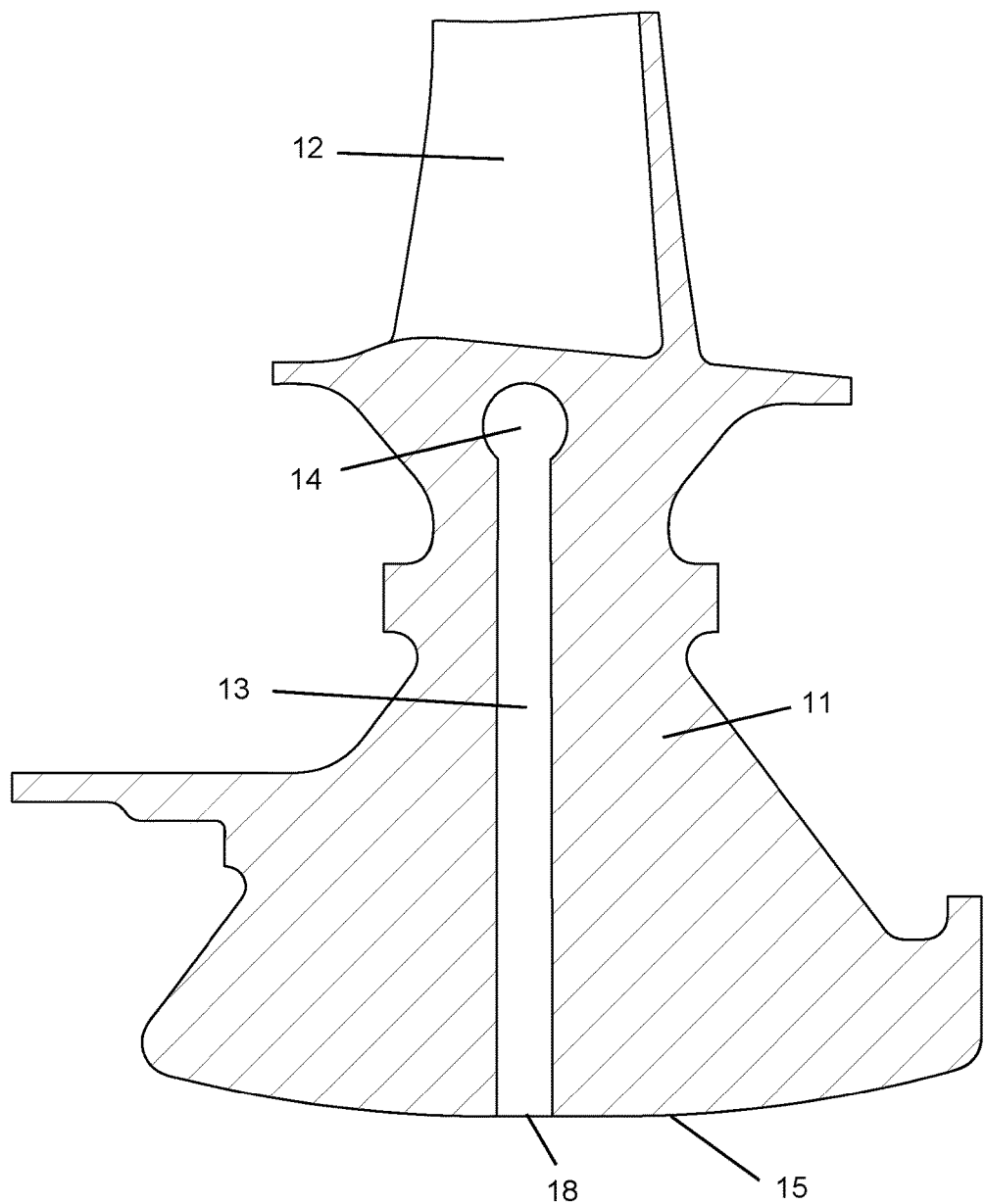
FIG. 4 shows a cross section side view of the IBR of the present invention with disk bore cooling holes and a circumferential channel.
Figure 6:
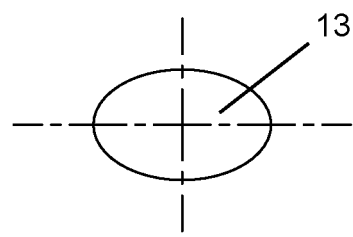
FIG. 6 shows a cross section view of one of the elliptical shaped radial cooling holes having a major axis greater than a minor axis in the IBR of the present invention.
Figure 7:
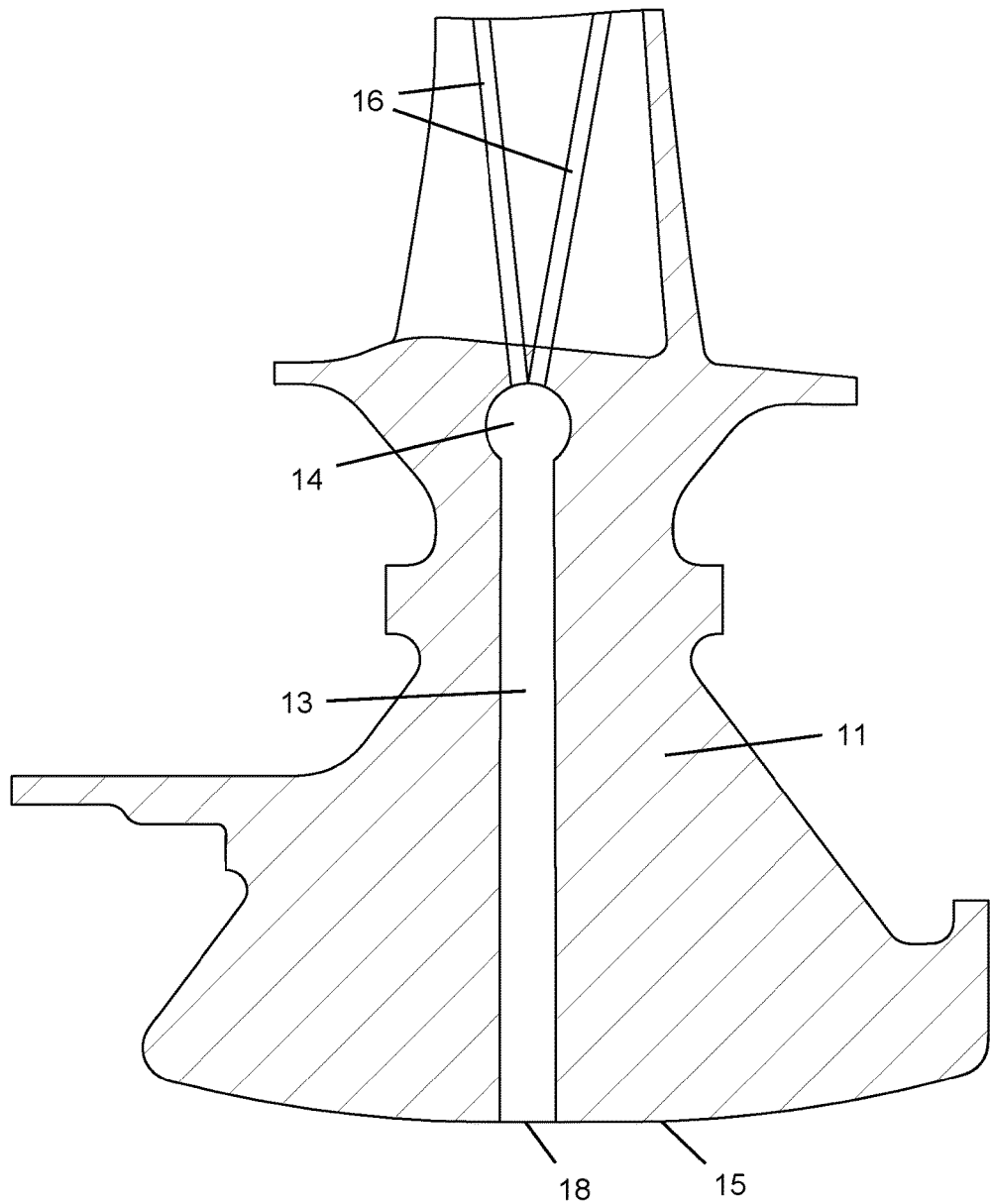
FIG. 7 shows a cross section side view of a first embodiment of the IBR with cooling holes in a dishing shaped bore and the blade of the present invention.

FIG. 4 shows a cross section of the IBR with radial cooling air supply holes 13 that discharge into a circumferential channel 14 that is formed just below the platform of the blade. The radial supply holes 13 open in the bore at entrance holes 18 and discharge into the circumferential channel 14. In the FIG. 4 embodiment of the IBR of the present invention, the disk bore has a dishing inward shape 15. The radial supply holes 13 have an elliptical cross section shape as seen in FIG. 6 in which the major axis extends in a direction perpendicular to the axis of the bore and the minor axis of the hole 13 extends in a direction parallel to the axis of the bore. This shape reduces the stress in the region of the hole openings 18. The circumferential channel 14 has a greater diameter than the radial cooling holes 13.

The stress levels in the disk are the greatest near to the axial bore. However, the stress levels are still quite high even in the section of the disk near to the blades. Thus, the radial holes 13 can have the elliptical cross sectional shape from the inlet opening 18 to the outlet discharge into the circumferential channel 14. However, the radial cooling holes 13 could transition into a circular cross sectional shape toward the discharge into the circumferential channel 14 while still being within an acceptable level of stress.

Figure 5:
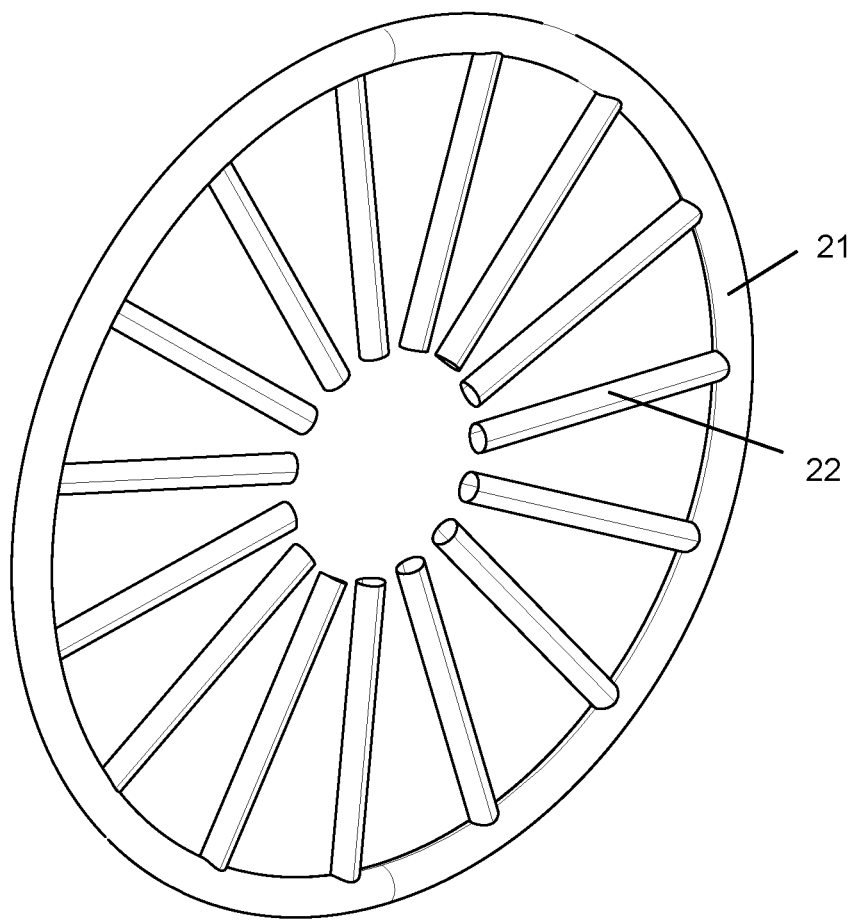
FIG. 5 shows a ceramic core used to form the disk bore cooling holes in the IBR of the present invention.

FIG. 5 shows a schematic view of a ceramic core that forms the radial supply holes 13 and the circumferential channel 14. The ceramic core includes the radial supply hole forming pieces 21 and the circumferential channel forming piece 22. The IBR is cast with the ceramic core of FIG. 5 to form the cooling air supply holes to the blades. After the IBR has been cast in which the radial supply holes 13 and the circumferential channel 14 has been formed within the metal IBR, the blade cooling holes 16 are formed. The blade cooling holes 16 can be formed by EDM or other drilling processes. The blade cooling holes 16 are formed after the IBR has been cast because of the small size of the blades.

Figure 8:
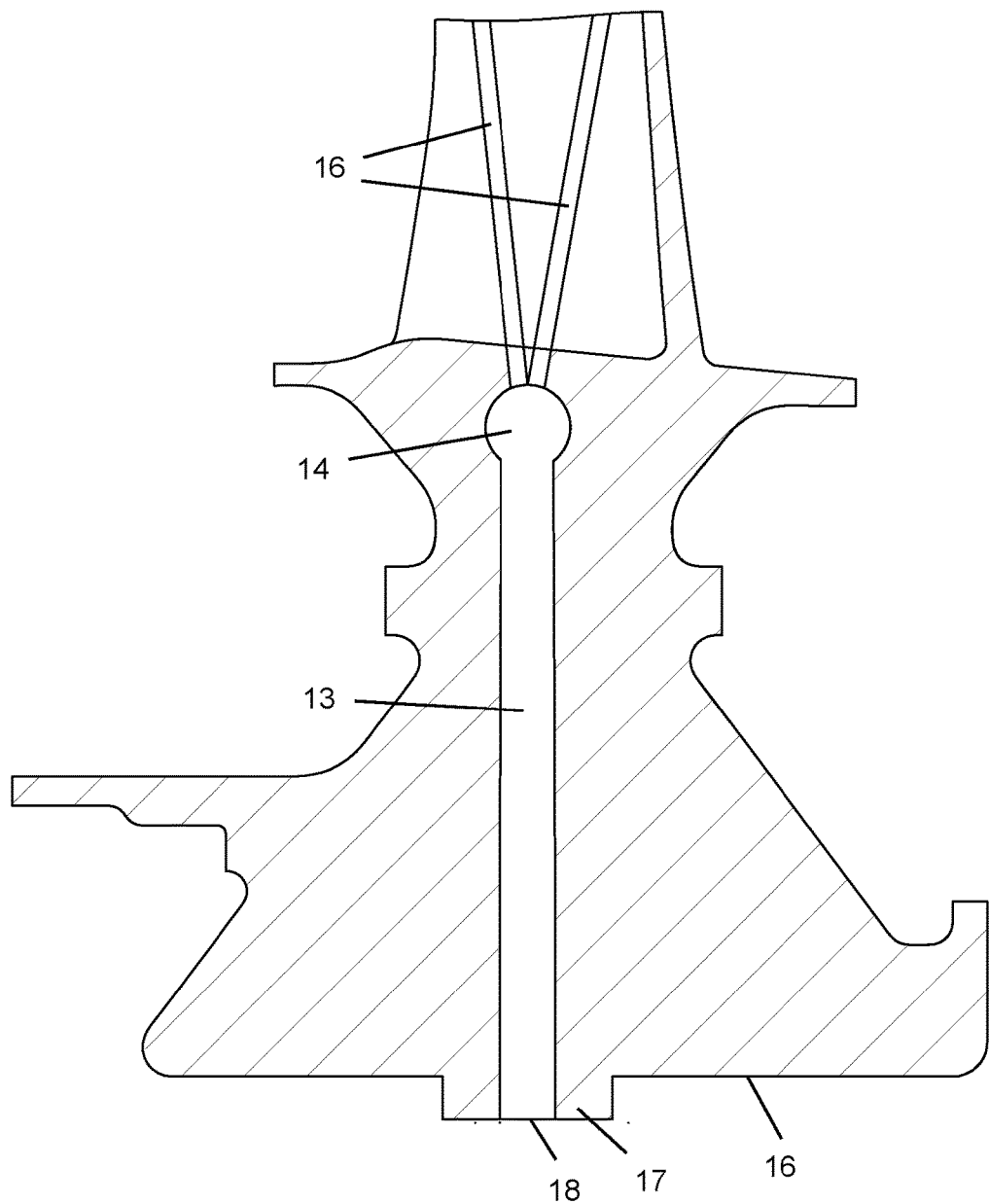
FIG. 8 shows a cross section side view of a second embodiment of the IBR with cooling holes in a projection of the disk bore and the blade of the present invention.

FIG. 8 shows a second embodiment of the IBR of the present invention. Instead of the bore with the dishing inward shape, the bore in straight 16 but includes an annular projection 17 in which the cooling supply holes 13 open. The annular projection 17 is a 360 degree annular projection within the axial bore 16.

When the IBR is in operation, the stress field of the disk has high tangential stress at the bore and a much weaker axial compressive stress at the same location. By forming the radial cooling holes 13 with the elliptical cross section shape, the stress concentration is reduced at the high tangential stress locations. The size and number of the radial supply holes 13 can be tailored to the coolant flow requirements and the stress field in the rotor in order to achieve the required rotor life. The circumferential ring 21 of the ceramic core provides stability for the radial cooling supply forming pieces 22 during the casting process and a target to drill into when the cooling holes 16 in the blade are formed.

The disk bore with the dishing inward shape 15 or the straight axial bore 15 with the projection 17 both provide improvement in the life of the IBR. The high stress concentrations occur at the cooling supply hole entrance and the elliptical shape of the holes 13 provide for reduced stress concentration in the tangential direction but the sharper acute corner of the ellipse yields a higher stress concentration. Although axial stress is small at this location, it combined with the stress concentration can drive the result concentrated stress higher than desired. The solution is to place the supply hole opening in a region where the axial stress is low, and this is achieved with the bowing of the bore or the projection on a straight bore.

Figure 9:
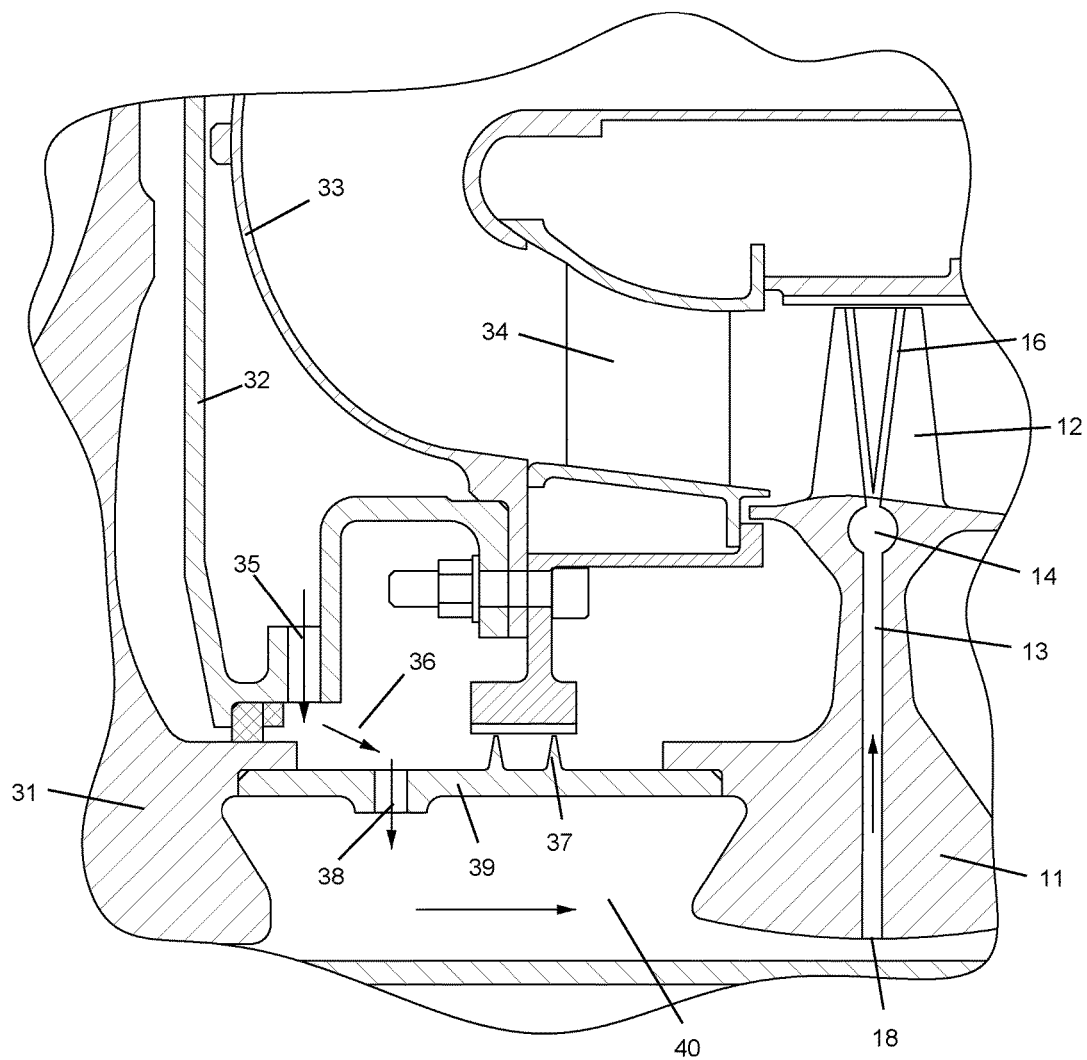
FIG. 9 shows a cross section vide of a section of an engine with the cooling air supply path for the rotor disk of the present invention.

FIG. 9 shows a section of a gas turbine engine with the rotor blade cooling circuit described above with a cooling air supply circuit to deliver the cooling air from a compressor outlet to the radial cooling air holes 13 within the rotor 11. FIG. 9 shows a compressor disk 31, a combustor case 32, and a combustor liner 33, where compressed air discharged from the compressor flows through a diffuser and then flows around the combustor liner 33 where most of the compressed air flows into the combustion chamber and then through the first stage stator vanes 34. Some of the compressed air between the combustor case 32 and the combustor liner 33 flows into an arrangement of angled and inward flowing nozzles 35 which produces a swirling motion of the compressed air in a direction of rotation of the rotating part of the engine which includes the compressor disk 31 connected to the rotor disk 11 through a shaft 39. Shaft 39 connects the compressor disk 31 to the turbine disk 11 and all three rotate as one unit. The angled nozzles 35 impact a swirl motion to the air before the air exits into a cavity 36 formed between the static combustor case 32 and the rotating shaft 39. A labyrinth seal teeth 37 extends from the shaft 39 to form a seal with an underside surface of the static part of the stator vane 34 lower section. Swirling the air in the direction of the rotor travel permits the cooling air to pass through rotating radial holes 38 and into an inner cavity 40. This pre-swirl motion functions to minimize entrance losses as the compressed air passes through the shaft. The air then flows aft and enters radial holes 13 in the bore of the rotor disk 11 and is pumped outward by rotation of the rotor disk 11 to be used to cool the rotor blades 12. The angled holes 35 that produce a swirling motion of the air accelerates the air in the direction of rotation of the rotating holes 38 which adds angular momentum to the air and thus minimizes parasitic loses. Also, by bringing the air inboard and passing the air through the shaft at a small radius location, the angular momentum of the pass-through holes 38 is greatly reduced as opposed to introducing the air closer to the flow path.

I claim:

1. An integrally bladed rotor for a turbomachine comprising:
   a rotor disk with a plurality of rotor blades extending from a rim of the integrally bladed rotor;
   an axial bore;
   a circumferential channel located in an outer section of the rotor disk near to the plurality of rotor blades;
   a plurality of radial extending cooling holes each having an inlet opening in the axial bore and an outlet opening into the circumferential channel;
   each of the plurality of rotor blades having a cooling air hole connected to the circumferential channel;
   the radial extending cooling holes having a section of the holes with an elliptical cross section shape with a major axis greater than a minor axis; and,
   the major axis is aligned perpendicular to a rotative axis of the axial bore.

2. The integrally bladed rotor of claim 1, and further comprising:
   the axial bore has a dishing inward shape with a continuous curvature from an inlet side of the axial bore to an outlet side.

3. The integrally bladed rotor of claim 1, and further comprising:
   the axial bore is a straight axial bore;
   an annular projection within the straight axial bore; and,
   the radial extending cooling holes pass through the annular projection and opening on an inner surface of the annular projection.

4. The integrally bladed rotor of claim 1, and further comprising:
   the circumferential channel has a circular cross sectional shape.

5. The integrally bladed rotor of claim 1, and further comprising:
   the circumferential channel has a greater diameter than the radial cooling holes.

6. The integrally bladed rotor of claim 1, and further comprising:
   the radial cooling holes have the elliptical cross sectional shape at least from the inlet opening to a section of the disk and a circular cross section shape opening into the circumferential channel.

7. The integrally bladed rotor of claim 1, and further comprising:
   the radial cooling holes have the elliptical cross sectional shape from the inlet opening to the discharge into the circumferential channel.

8. A turbine rotor disk comprising:
   a rotor disk having an axial bore;
   a plurality of rotor blades extending out from the rotor disk;
   a circumferential channel formed within the rotor disk;
   a plurality of radial extending cooling air holes having an inlet end opening into the axial bore and an outlet end opening into the circumferential channel;
   each of plurality of rotor blades having an airfoil cooling passage connected to the circumferential channel;
   the inlet opening of each of the radial extending cooling air supply holes having an elliptical cross sectional shape with a major axis greater than a minor axis; and,
   the major axis for each of the plurality of inlets are perpendicular to a rotative axis of the axial bore.

9. The turbine rotor disk of claim 8, and further comprising:
   the rotor disk is an integrally bladed rotor.

10. The turbine rotor disk of claim 8, and further comprising:
    the axial bore is a straight axial bore;
    an annular projection within the straight axial bore; and,
    the radial extending cooling air holes pass through the annular projection and opening on an inner surface of the annular projection.

11. The turbine rotor disk of claim 8, and further comprising:
    the circumferential channel has a greater diameter than the radial cooling holes.

12. The turbine rotor disk of claim 8, and further comprising:
    the radial cooling holes have the elliptical cross sectional shape at least from the inlet opening of the axial bore and a circular cross section shape opening into the circumferential channel.

13. The turbine rotor disk of claim 8, and further comprising:
    the axial bore has an inward dishing shape around the inlet openings of each of the radial extending cooling air supply holes.

* * * * *